April 22, 1947.   F. ELKINGTON ET AL   2,419,204
PRODUCTION OF CONCENTRATED SLURRIES OF MAGNESIUM HYDROXIDE
Filed Feb. 3, 1941
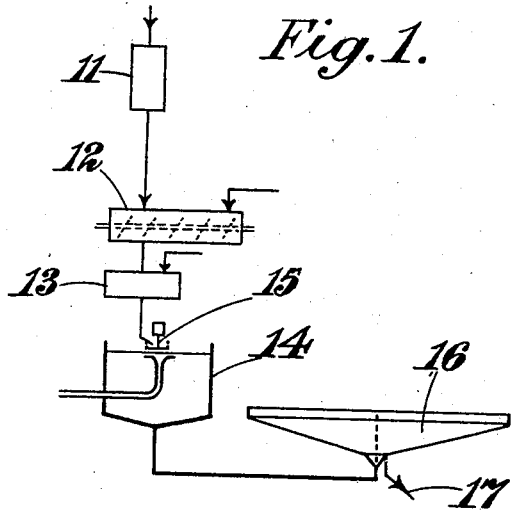
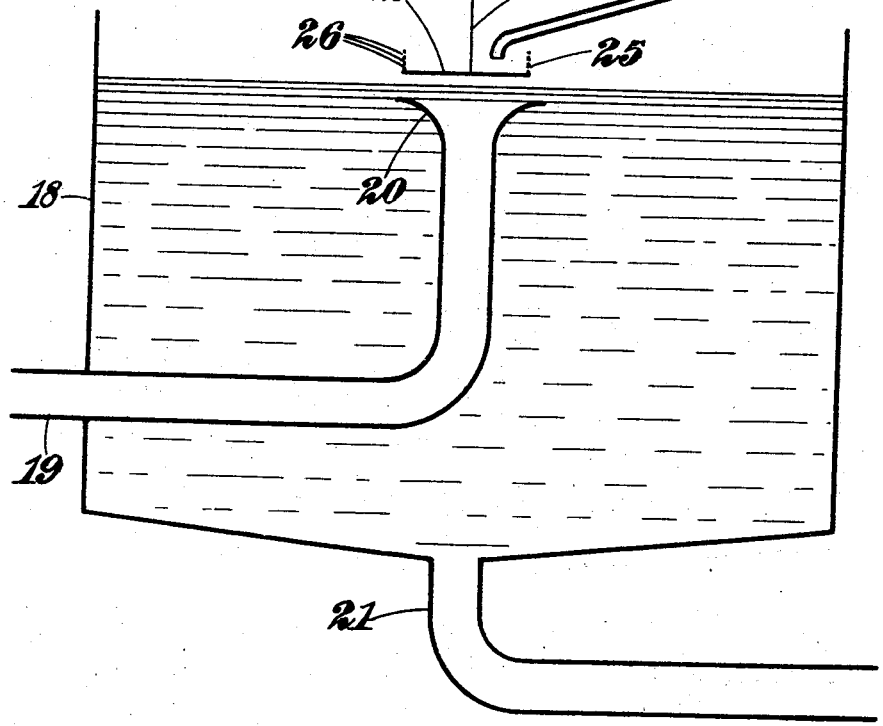
Inventors
Frank Elkington and
Heinz Henry Chesny
By Stebbins, Blenko,
and Parmelee
Attorneys Patented Apr. 22, 1947

2,419,204

UNITED STATES PATENT OFFICE 2,419,204

PRODUCTION OF CONCENTRATED SLURRIES OF MAGNESIUM HYDROXIDE

Frank Elkington, Sheffield, and Heinz Henry Chesny, Worksop, England

Application February 3, 1941, Serial No. 377,226
In Great Britain January 22, 1940

10 Claims. (Cl. 23—201)

This invention is for improvements in or relating to the production of concentrated slurries of magnesium hydroxide and has particular reference to the formation of such slurries which are formed e. g. by the interaction of calcined and slaked dolomite and sea water or other similar dilute brines and which can subsequently be converted to magnesium oxide, carbonate or basic carbonate. Throughout this specification and claims the term "sea water" is to be read as including other similar dilute brines.

The slaking media for the calcined dolomite should preferably consist of a mixture of sea water and fresh water in the ratio of 70% fresh water and 30% sea water in order to avoid precipitation of calcium sulphate and at the same time bring about the formation of magnesium hydroxide as nuclei to further increase the granularity of the resulting flocs.

Magnesium hydroxide may be produced by the interaction of calcined and slaked dolomite and sea water or by the interaction of slaked lime and sea water and the hydroxide may be amorphous or crystalline according to the particular conditions employed. Thus, in Chesny United States Letters Patent No. 2,224,780 there is described a method for producing crystalline magnesium hydroxide from dolomite which comprises calcining the dolomite to convert substantially all the carbonate to oxide, forming a slurry of the calcined dolomite and bringing the slurry into contact with an aqueous solution containing convertible magnesium salts without the application of heat and at a velocity of flow just sufficient to bring about effective mixing. In one way of carrying out that method the slurry of calcined and slaked dolomite is introduced below the surface of sea water under controlled conditions. The present invention consists in a modification of the general process described in that specification. In Chesny United States Letters Patent No. 2,089,339 the production of rapidly settling magnesium hydroxide from a calcium hydroxide slurry and sea water under controlled conditions is described.

In the production of crystalline magnesium hydroxide the rapid settling is not brought about by flocculation only, since this takes place to an extent insufficient to bring about rapid settling. In the case of the production of crystalline magnesium hydroxide from calcined and slaked dolomite and sea water the rate of reaction is so slow that only a portion of the calcium hydroxide present in the slaked hydrous oxides will be converted into magnesium hydroxide by reaction with the magnesium salts present in the sea water. On this account, even if flocculation could be obtained to bring about an increased rate of settling, there would still remain the difficulty of retaining the flocs without destruction for a sufficient time to ensure complete conversion of calcium hydroxide to magnesium hydroxide.

It is an object of the present invention to overcome the above-mentioned difficulties and to provide a method for the production of rapidly settling crystalline magnesium hydroxide precipitate while at the same time ensuring rapid and complete interaction of the calcium hydroxide with the dilute brine.

According to the present invention there is provided a process for the production of rapidly settling crystalline magnesium hydroxide from dolomite which comprises calcining dolomite to convert substantially all the carbonate to oxide, slaking the calcined dolomite to form a slurry and bringing the slurry into contact with sea water by spraying the slurry, preferably obliquely, on to the surface of a moving body of the said sea water. In this way, due to the impact of the droplets of slurry on the surface of the water, very thin plate-like aggregates of crystalline precipitate are formed. Rapid diffusion of the convertible magnesium salts contained in the sea water through the plate-like aggregates takes place and the calcium hydroxide reacts with the magnesium salts completely without the necessity for breaking up the crystal aggregates.

In one method of carrying the invention into effect the dolomitic hydroxide slurry may be sprayed on to the surface of a horizontally moving body of sea water flowing through a reaction vessel. The dimensions of the vessel are such as to permit the retention of the sea water and the slurry for a period of several minutes. This period varies according to the rate of flow from 25 to 40 minutes and is based on an approximate concentration of magnesium salts in solution equivalent to 20 lbs. of replaceable MgO per 1000 gallons of solution. The liquid with its precipitate is removed continuously to a settling tank where the magnesium hydroxide settles and the spent brine overflows to waste. The reaction vessel and settling tank may preferably consist of separate units. Alternatively, the reaction vessel may form part of the settling tank from which it is separated by a suitable partition.

In an alternative method of carrying the invention into effect the dolomitic hydroxide slurry preferably prepared as above described is sprayed on to the surface of an upwardly moving body of sea water. The partially reacted slurry consisting substantially of magnesium hydroxide but also containing up to 10% of solid calcium salts is permitted to settle, counter-current to the flow of sea water, and is subsequently removed as a slurry from the bottom of the vessel. This slurry which has partially reacted with sea water is then brought into contact with a second column of sea water in a separate vessel in order to complete the conversion of the remaining calcium salts and finally the magnesium hydroxide slurry and spent brine are introduced into a settling tank in which the magnesium hydroxide concentrates to a thick sludge and from which the sea water overflows to waste. This modification of the invention possesses the advantage that it is only necessary to add a relatively small volume of dilute brine as compared with that handled in the earlier modification referred to.

The sludge may be heated prior to being filtered and the filtrate obtained in the filtering step may with advantage be employed in the initial slaking of the calcined dolomite.

The apparatus for carrying the process into effect may comprise means for forming droplets of slurry and for distributing them upon the surface of the sea water. Such means may include stationary or moving nozzles or splash plates. One preferred form of apparatus employs a rotating disc with a distributing baffle disposed at its centre in order to distribute the slurry evenly around the edge of the disc, at the same time reducing to a minimum the velocity of the slurry impinging on the disc. The disc has a raised edge which is provided with numerous slots through which the slurry is sprayed by centrifugal force. The raised edge may conveniently consist of expanded metal and in order to obtain a flat angle of impact the rotary disc is preferably located at a distance of only a few inches e. g. from 2 inches to 6 inches above the surface of the brine. The speed of rotation of the disc may vary between 20 and 80 R. P. M. The slower speed is normally used for reactive slaked dolomitic hydrous oxide produced from dolomite by calcination in accordance with the method described in British Patent specifications Nos. 482,339 and 482,340.

The horizontal flow of sea water may be obtained by leading the sea water into a reaction vessel through a pipe in the side thereof which pipe thereafter turns upwardly and terminates in an enlarged mouthpiece which is preferably funnel-shaped or in the form of hydraulic bell mouth. The mouthpiece is preferably disposed at a distance of some 6 inches below the level of the liquid in the reaction vessel and it may conveniently contain a baffle for minimising turbulence and increasing the accuracy with which the height can be adjusted.

The particular plate-like form of the precipitated aggregates ensures the production of a high final concentration of magnesium hydroxide. Thus, after reacting dolomitic hydroxide with sea water the concentration of magnesium hydroxide may amount to 49 lbs. Mg(OH)$_2$ per 1,000 gallons and within one hour the concentration may increase to 250 lbs. per 1,000 gallons, after five hours to 580 lbs., after twenty-four hours to 800 lbs. and after one week to 1,500 lbs. per 1,000 gallons. Comparing these rates of concentration with those of crystalline magnesium hydroxide as at present produced, the latter possessed a concentration of only 675 lbs. per 1,000 gallons after the first day and of 1,100 lbs. per 1,000 gallons after one week.

When applying the present method of forming plate-like aggregates the initial settling rate of the magnesium hydroxide becomes quite unimportant owing to the rapidity of separation of the solids from the bulk of the spent sea water.

The capacity of a settling tank is governed in the first instance by the rate of separation of solids and liquid. This rate determines the surface area of the tank. The rate of concentration determines the volume of slurry which must be retained in the tank for a given time in order to be able to withdraw material continuously at the desired concentration. The very high initial cost of settling tanks, which generally consist of concrete basins with a capacity of one to five million gallons and are fitted with scraper gears or thickeners, prevents the use of tanks capable of retaining the settled slurries for a long period of time.

It has been found that the best concentration for further treatment of concentrated magnesium hydroxide lies between 1.25 and 1.50 lbs. of Mg(OH)$_2$ per gallon.

The advantages resulting from the present invention will be apparent when it is understood that with the plate-like aggregates of magnesium hydroxide a concentration of 150 grams of Mg(OH)$_2$ per litre is reached if a slurry is retained for one week while three-and-a-half weeks' standing is required to obtain a similar concentration in the case of ordinary crystalline magnesium hydroxide. For a given size of settling tank, the concentrations of magnesium hydroxide in the slurries consisting of plate aggregates formed by the present invention, crystalline magnesium hydroxide and hydrous magnesium hydroxide respectively, would be as follows:

| | Grams per litre |
|---|---|
| Plate aggregates | 150 |
| Crystalline magnesium hydroxide | 110 |
| Hydrous magnesium hydroxide | 80 |

Thus, to obtain one ton of dry Mg(OH)$_2$ the volumes of slurry to be treated will be as follows:

| | Gallons |
|---|---|
| Plate aggregates | 1,490 |
| Crystalline magnesium hydroxide | 2,035 |
| Hydrous magnesium hydroxide | 2,795 |

It follows that the output of a given size of vacuum filter such as is used in the filtration of magnesium hydroxide will be very nearly doubled when dealing with a slurry containing 150 grams of plate aggregates per litre as compared with a slurry containing 80 grams per litre of hydrous magnesium hydroxide.

It will be understood, therefore, that the present invention represents a considerable saving not only in the capital cost of apparatus but also in the consumption of power.

Following is a description by way of example, and with reference to the accompanying drawing, of one way of carrying the invention into effect.

In the drawing:

Figure 1 shows in diagrammatic form the general layout of apparatus for producing magnesium hydroxide by the interaction of sea water and a slurry of calcined and slaked dolomite;

Figure 2 shows one preferred form of reaction vessel in which the mixing of the sea water and the slurry of calcined and slaked dolomite takes place.

Referring to Figure 1, 11 is a kiln for the calcination of dolomite, 12 is an apparatus in which the calcined dolomite is slaked, and 13 a vessel in which the formation of a slurry of the calcined and slaked dolomite takes place. 14 is a reaction vessel in which the slurry of dolomite is brought into contact with the sea water, the distribution of the slurry being carried out by means of the centrifugal distributor 15. The precipitate containing the magnesium hydroxide passes from the reaction vessel 14 to a settling tank 16 from which the spent sea water overflows and the magnesium is drawn off by way of the pipe 17.

Referring to Figure 2, which is a diagrammatic view on a larger scale of the reaction vessel 14 shown in Figure 1, 18 is the reaction vessel itself and this is supplied with sea water through a pipe 19 passing through the side of the vessel. This pipe is bent upwardly at the centre of the vessel and terminates in a hydraulic bell-mouth 20. The bottom of the reaction vessel slopes downwardly and inwardly to a central pipe 21 from which the sea water with its precipitate is drawn off to a settling tank (similar to 16, Figure 1).

Immediately above the hydraulic bell-mouth 20 and only a few inches above the surface of the water in the reaction vessel 14 there is arranged a device for distributing the slurry of calcined and slaked dolomite over the surface of the sea water and consisting of a horizontally mounted disc 22 having a central vertical axis 23 driven at high speed by an electric motor 24. The disc 22 has an upstanding rim 25 which is provided with slots or perforations 26 through which the slurry, which is fed through a pipe 27 into the tray thus formed is thrown by centrifugal force as the disc rotates. The droplets of slurry are projected at a flat angle over the surface of the sea water in the reaction vessel and the precipitate passes in a downward direction with water through the pipe 21 to a settling vessel, from which the precipitate is subsequently recovered.

We claim:

1. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by spraying the slurry onto a flowing surface of a body of the said brine.

2. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by spraying the slurry obliquely on to a horizontally flowing surface of a body of brine in a reaction vessel.

3. A process for the production of rapidly settling crystalline magnesium hydroxide from dolomite which process comprises calcining dolomite to convert substantially all the carbonate to oxide, slaking the calcined dolomite with a mixture of fresh water and brine containing convertible magnesium salts, forming a slurry and bringing the said slurry into contact with a brine containing convertible magnesium salts by spraying the slurry on to a flowing surface of a body of the said sea water.

4. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with sea water by spraying the slurry on to the surface of a body of sea water flowing vertically through a reaction vessel, said surface flowing in a generally horizontal direction at the time of impact with the slurry.

5. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by spraying the slurry on to a flowing surface of a body of brine flowing through a reaction vessel, the dimensions of the said reaction vessel and the rate of flow of the brine being such as to permit of the retention in the reaction vessel of the brine and the slurry for a period of several minutes.

6. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by spraying the slurry on to a flowing surface of a body of brine flowing through a reaction vessel, the dimensions of the said reaction vessel and the rate of flow of the brine being such as to permit of the retention in the reaction vessel of the brine and the slurry for from 25 to 40 minutes.

7. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by spraying the slurry on to a flowing surface of a moving body of the said brine in a reaction vessel, removing water and the precipitate containing magnesium hydroxide continuously from the said reaction vessel to a settling tank and there allowing the magnesium hydroxide to settle and the spent brine to overflow to waste.

8. A process for the production of rapidly settling magnesium hydroxide from dolomite which process comprises calcining dolomite to convert substantially all the carbonate to oxide, slaking the calcined dolomite, forming a slurry and bringing the said slurry into contact with a brine containing convertible magnesium salts by forcing the brine to flow upwardly in a reaction vessel, horizontally and then downwardly and spraying the slurry onto the horizontally moving surface of the brine and subsequently removing water and the precipitate containing magnesium hydroxide to a settling tank.

9. A process for the production of rapidly settling crystalline magnesium hydroxide from dolomite which process comprises calcining dolomite to convert substantially all the carbonate to oxide, slaking the calcined dolomite, forming a slurry and bringing the said slurry into contact with a brine containing convertible magnesium salts by forcing the brine to flow upwardly in a reaction vessel, horizontally and then downwardly and spraying the slurry onto the horizontally moving surface of the brine, allowing the precipitate to settle to the bottom of the vessel and bringing the precipitate into contact with further brine in order to complete the conversion of calcium salts remaining herein.

10. A process for the production of rapidly settling crystalline magnesium hydroxide from dolomite which process comprises calcining dolomite to convert substantially all the carbonate to oxide, slaking the calcined dolomite with filtrate obtained from magnesium hydroxide sludge obtained in a later stage of the said process, forming a slurry and bringing the said slurry into contact with a brine containing convertible magnesium salts by spraying the slurry obliquely onto a flowing surface of a body of said brine.

FRANK ELKINGTON.
HEINZ HENRY CHESNY.

REFERENCES CITED

The following references are of record in the file of this patent:

UNITED STATES PATENTS

| Number | Name | Date |
|---|---|---|
| 2,224,780 | Chesny | Dec. 10, 1940 |
| 2,227,534 | Collins | Jan. 7, 1941 |
| 1,270,589 | Barstow | June 25, 1918 |
| 2,041,047 | Chesny et al. | May 19, 1936 |
| 2,089,339 | Chesny | Aug. 10, 1937 |
| 2,124,002 | Mastin | July 19, 1938 |
| 2,150,608 | Olier | Mar. 14, 1939 |
| 1,284,488 | Steward | Nov. 12, 1918 |
| 2,079,158 | Rachat | May 4, 1937 |

OTHER REFERENCES

"Comprehensive Treatise on Inorganic Chemistry," by Mellor, vol. IV, page 291, Longmans, Green & Co., London. (Copy in Div. 59.)